United States Patent [19]

Little

[11] Patent Number: 4,731,113
[45] Date of Patent: * Mar. 15, 1988

[54] METHOD FOR THE RECOVERY OF PRECIOUS METALS FROM ORES

[76] Inventor: Roger H. Little, 225 S. Second, Custer, S. Dak. 57730

[*] Notice: The portion of the term of this patent subsequent to Feb. 24, 2004 has been disclaimed.

[21] Appl. No.: 896,823

[22] Filed: Aug. 13, 1986

Related U.S. Application Data

[63] Continuation-in-part of Ser. No. 766,060, Aug. 15, 1985, Pat. No. 4,645,535.

[51] Int. Cl.$^4$ .............................................. C22B 11/04
[52] U.S. Cl. ..................... 75/101 R; 75/108; 75/103; 75/109; 75/115; 75/118 R; 423/27; 423/32; 423/34; 423/36; 423/41; 423/42
[58] Field of Search ............ 75/2, 97 A, 101 R, 103, 75/108, 109, 115, 121, 118 R; 423/22, 27, 32, 34, 36, 41, 42

[56] References Cited

U.S. PATENT DOCUMENTS

| | | | |
|---|---|---|---|
| 3,317,313 | 5/1967 | Buggs et al. | 75/118 R |
| 3,902,896 | 9/1975 | Borbely et al. | 75/118 R |
| 3,960,565 | 6/1976 | Fish et al. | 96/60 R |
| 4,021,264 | 5/1977 | Knorre et al. | 134/3 |
| 4,051,026 | 9/1977 | Cremer et al. | 210/38 B |
| 4,070,182 | 1/1978 | Genik-Sas-Berezowsky | 75/103 |
| 4,145,212 | 3/1979 | Bodon | 75/118 R |
| 4,192,851 | 3/1980 | Hirsch et al. | 423/27 |
| 4,269,622 | 5/1981 | Kerley, Jr. | 75/118 R |
| 4,319,922 | 3/1982 | Macdonald | 75/108 |
| 4,342,591 | 8/1982 | Lesoille | 75/101 R |
| 4,369,061 | 1/1983 | Kerley, Jr. | 75/118 R |
| 4,561,947 | 12/1985 | Schulze | 75/118 R |
| 4,645,535 | 2/1987 | Little | 423/27 |

FOREIGN PATENT DOCUMENTS 1127833  6/1986  Japan ..................................... 423/27

*Primary Examiner*—Robert L. Stoll
*Attorney, Agent, or Firm*—Fulwider, Patton, Rieber, Lee & Utecht

[57] ABSTRACT

A process for the recovery of precious metals from ore containing the same is disclosed. The process includes the formation of a lixiviant solution including a thiourea compound, urea and an alkali lignin sulfonate. The ore is then exposed to this lixiviant solution to extract the previous metals therefrom, and the dissolved previous metals are then recovered from the solution.

52 Claims, No Drawings

METHOD FOR THE RECOVERY OF PRECIOUS METALS FROM ORES

CROSS-REFERENCE TO RELATED APPLICATIONS

This is a continuation-in-part of my co-pending application, Ser. No. 06/766,060, filed Aug. 15, 1985, now U.S. Pat. No. 4,645,535.

BACKGROUND OF THE INVENTION

1. Field of the Invention

The present invention relates generally to processes for recovering precious metals from ore containing the same and, more particularly, to processes for recovering precious metals such as silver and gold from low grade ore. Specifically, the present invention relates to an improved process for the extraction of precious metals by lixiviation from ores containing the same, which process is highly efficient and environmentally safe.

2. Description of the Prior Art

There are many processes and techniques for recovering precious metals such as silver, gold, platinum and the like, from ores containing these metals. The particular technique used will frequently depend upon the type of ore containing the precious metal as well as the grade of ore, i.e., the higher the grade of ore, the greater the concentration of precious metal therein. Low grade ore creates more problems during processing in that the net yield of precious metal per unit weight of ore is less. Moreover, there is more non-precious metal material present in low grade ore which may interfere with various processing stages.

Lixiviation is a technique widely used to extract a soluble component from a solid mixture by the leaching of that component from the solid. Lixiviation utilizing various cyanide solutions is an extremely popular technique for extracting precious metals from their ores. However, such cyanide solutions are highly toxic thereby requiring special handling procedures. They are also highly damaging to the environment. Moreover, cyanides are costly and are difficult to use with certain types of ores, especially those ores containing copper and/or manganese, since these materials readily contaminate the cyanide. Since such contamination materials are frequently present in varying degrees in most ores, there is a substantial loss rate with the cyanide solutions as well as relatively poor recovery rates from the precious metals. As a result, there has been considerable effort expended in attempting to find alternate lixiviation processes which do not utilize cyanide based solutions.

There are many difficult-to-treat ores in existence which contain manganese, copper oxides, and various other constituents along with significant quantities of silver, gold and other precious metals. It would be highly desirable to be able to extract these precious metals from these ores if a suitable and sufficiently inexpensive technique existed for such recovery. However, the present techniques, and in particular cyanide-based techniques, are simply not adequate, and these ores remain for the most part an untapped mineral resource.

Various lixiviating agents other than cyanide have been looked at as potential replacements for cyanide-based solutions. One such process is disclosed in U.S. Pat. No. 4,369,061, issued to KERLEY, JR. on Jan. 18, 1983, which process utilizes ammonium thiosulfate liquor as the lixiviating agent in the presence of copper. Other processes, including that disclosed in U.S. Pat. No. 4,342,591, issued to LESOILLE on Aug. 3, 1982, utilize thiourea as a lixiviating agent. It has been found that thiourea extracts precious metals from ore at a substantially faster rate than do cyanide solutions. However, certain disadvantages to thiourea lixiviating solutions are that they tend to cost substantially more than cyanide-based solution systems, and they also tend to be more selective than cyanide. Thus, existing thiourea lixiviants are generally not appropriate for use with a number of different types of ores, for instance carbonate ores. Consequently, there still exists a significant need for an efficient, cost effective, and environmentally safe extraction technique for precious metals to replace the state of the art techniques utilizing cyanide solutions and the like.

SUMMARY OF THE INVENTION

In accordance with the present invention, a process is provided for the recovery of precious metals from ores containing the same. The process includes forming a lixiviant solution including a thiourea compound, urea and an alkaline lignin sulfonate. The ore is then exposed to the lixiviant solution to extract the precious metals therefrom, and the dissolved precious metals are then recovered from the solution. While any known process for recovering the precious metals from the lixiviant solution may be used with the invention, one preferred technique is that of passing the lixiviant solution containing the dissolved precious metals through a packed bed extraction column to remove the precious metals from solution and deposit them in the bed. The precious metals are then recovered from the packed bed utilizing known procedures.

DETAILED DESCRIPTION OF THE PREFERRED EMBODIMENTS

The technology of using thiourea as a lixiviant for the extraction of precious metals such as gold and silver from ore is not new. As previously discussed, information concerning these chemical systems has been published for many years. Moreover, the recovery of the dissolved gold and silver from the lixiviant solution, also known as the pregnant solution, may be performed using a variety of known techniques including ion-exchange resins, iron-in-pulp processes, lead-in-pulp processes, electrodeposition, carbon adsorption, and the like.

Some of the major problems with these extraction recovery techniques are that they are either prohibitively expensive in chemical costs, prohibitively slow, or very inefficient in that the recovery rate of the available precious metals is less than 95 percent. It has been discovered through the use of the present invention, however, that an extraction process utilizing a thiourea-based lixiviant solution may be modified to produce substantial precious metal yields over relatively short periods of time. Moreover, it has been found that the present invention may be utilized while maintaining cost effectiveness.

The generally known lixiviant extraction (thiourea) process includes exposing the ore containing the precious metals to a lixiviant solution containing thiourea for a predetermined period of time. After this period of ore exposure, the dissolved precious metals are then recovered from the extractant solution. This second phase generally proceeds by passing the extractant (pregnant solution) through a packed bed extraction column wherein the dissolved precious metals are deposited in the powdered material making up the packed bed.

The essence of the present invention is the discovery that the addition of urea to the thioureabased extractant solution raised the extraction efficiency thereof to greater than 98 percent. Moreover, such an extraction efficiency was achieved in merely a matter of hours rather than days of ore exposure time as was required with prior thiourea lixiviant processes. It was also discovered that the addition of an alkaline lignin sulfonate to the extractant solution enabled the dissolved precious metals, such as gold and silver, to be deposited onto activated charcoal, powdered aluminum and other powdered agents in a packed column in a single pass while achieving extraction efficiencies exceeding 95 percent.

The process of the present invention may be carried out on any type of ore which includes precious metals such as gold, silver, platinum and the like. There is no need for limiting the precious metal concentration in the lixiviant solution. Examples of ore types which may be used with the present invention include oxides, sulfides, magnetites, hemetites, and the like.

The lixiviant solution is preferably an aqueous solution. Moreover, thiourea and thiourea derivatives such as phenyl-thiourea, alkyl and aryl derivatives, thiosemicarbazide, and the like, may be used in addition to or in lieu of thiourea itself. Therefore, the term "thioureabased" solution or "thiourea compound" material is used throughout this application and is intended to reflect the use of such thiourea or thiourea derivatives as may be known and selected from the art.

The lixiviant solution is preferably strongly acidic. In preferred form, the pH of the solution is maintained at approximately 1.0–1.5. Sulfuric acid or any other suitable acid may be utilized to maintain the pH at its proper level.

A typical example of the present invention includes forming a lixiviant solution containing approximately 2 lbs. (907 g.) of water, 2 g. thiourea, 2 g. urea, 1 g. potassium lignin sulfonate, and 3 g. ferric sulfate. To this solution, a sufficient amount of sulfuric acid was added to lower the pH to the range of about 1.0-1.5. To this lixiviant solution, approximately 2 lbs. (907 g.) ore of any type was added. It was found that this lixiviant solution extracted more than 98 percent of the precious metals, and in particular gold and silver, during an exposure time period ranging from 2-6 hours depending, primarily, upon the ore size and type.

When the above pregnant solution containing the dissolved precious metals was gravity passed through an extraction column packed with activated charcoal, powdered aluminum, powdered lead, powdered zinc or other such agents, more than a 95 percent recovery of the precious metals was achieved in merely one pass through the column. Subsequent recovery of the precious metals from the powdered materials in the column is performed using well known techniques in the art and shall not be discussed in any further detail herein. Moreover, as previously indicated, any desired technique may be used to recover the precious metals from the pregnant solution, the invention not being necessarily limited to adsorption through a packed bed extraction column as described above.

The process as described above may be carried out over an ambient temperature range of about 40 to about 140 degrees Fahrenheit, although optimum results are obtained between about 60 and about 90 degrees. At temperatures above about 140 degrees the processing time increases and the efficiency drops off rapidly, decreasing some 20% at 150 degrees with even more rapid loss of efficiency at higher temperatures. Below about 40 degrees efficiency also drops off rapidly until the lixiviant solution freezes, at which point the process can no longer be carried out at all.

The solution as described above contains about equal portions of thiourea and urea. The ratio between the thiourea and the urea can be varied, but the combination of urea and thiourea should comprise at least about 10% thiourea as required to optimize the recovery of silver and not less than about 10% urea as required to optimize the recovery of gold. For example, if a solution is prepared for use with a commercial quantity of ore, there should be at least about one gallon of urea to every nine gallons of thiourea (corresponding to 10% urea and 90% thiourea), and not more than about nine gallons of urea to every gallon of thiourea (corresponding to about 90% urea and 10% thiou rea). If the concentration of urea is less, the efficiency of gold extraction decreases, and if the concentration of thiourea is less, the efficiency of silver extraction decreases.

In addition, there should be at least about two gallons of the alkaline lignin sulfonate for every eight gallons of urea and thiourea. The efficiency of deposition of precious metal on the recovery bed goes down rapidly if the concentration of the lignin sulfonate decreases much below said amount. The alkaline lignin sulfonate may comprise, for example, potassium lignin sulfonate or sodium lignin sulfonate.

As already indicated, the pH is optimally about 1.0 to 1.5. At a pH of about 2.0 the efficiency is markedly beginning to decrease, and at a pH of about 3.5 the process is no longer viable.

Examples of specific extractions utilizing the process of the present invention are illustrated in the Examples provided below.

EXAMPLE I

An initial lixiviant solution containing 2 lbs. (about 907 g.) water, 2 g. urea, 2 g. thiourea and 3 g. ferric sulfate ($Fe_2SO_4$) with a pH in the range of 1.0–1.5 was prepared. No potassium lignin sulfonate was added at this time. Dissolved Au was added so that this initial pregnant solution contained approximately 0.094 oz. Au/ton. The pregnant solution containing the dissolved gold was then passed through a packed column of aluminum chips for approximately one hour. No deposition of Au took place. The solution was then passed through a column of zinc chips for approximately one hour, and 15% of the available Au was deposited therein. The solution was then passed through a packed column of lead chips for approximately one hour, and no deposition of gold took place. The solution was finally passed through an activated charcoal column, one pass, and 50% of the available Au was deposited.

At this point, 2 g. of potassium lignin sulfonate was added to the solution. This pregnant solution was then passed through a packed charcoal bed, and 95.6% of the available Au was deposited therein. Thus, the addition of potassium lignin sulfonate to the lixiviant solution containing dissolved precious metals substantially increased the capability of the packed bed to extract and recover the dissolved precious metals from the lixiviant solution.

EXAMPLE II

An initial lixiviant solution was prepared identical to that described in Example I. Initially, no potassium lignin sulfonate was added. Au was then added so that this initial solution contained approximately 0.078 oz. Au/ton. This pregnant solution containing the dissolved Au was passed once through a packed charcoal bed, and 44.6% of the available Au was deposited therein. This solution was then passed through the same column a second time, and no additional deposition of Au took place. A second lixiviant solution identical to that originally prepared for this Example II was then prepared, and 2 g. potassium lignin sulfonate was then added. This second lixiviant solution was then passed one time through a packed charcoal bed, and 94.6% of the available Au was deposited therein. Again, this Example II illustrates the fact that the addition of potassium lignin sulfonate to the lixiviant solution substantially increases the recovery rate of the dissolved precious metals from the lixiviant solution.

EXAMPLE III

A lixiviant solution was prepared as follows:
2 lbs. $H_2O$
2 g. urea
2 g. thiourea
3 g. $Fe_2SO_4$
1 g. potassium lignin sulfonate To this solution was added sufficient sulfuric acid to maintain the pH thereof to a level of approximately 1.0–1.5. Two pounds of −20 mesh sand containing 0.11 oz. Au/ton ore were then added to this lixiviant solution. Table I below describes the amount of dissolved Au present in the lixiviant extractant solution after various periods of time of exposure of the ore to the solution.

TABLE I

| Time (hrs.) | Oz. Au/ton |
|---|---|
| 1 hr. | 0.029 |
| 2 hrs. | 0.082 |
| 3 hrs. | 0.105 |

As can be seen from Table I, an extraction efficiency of 95.5% of the available Au from the ore was achieved by the lixiviant solution in only three hours.

EXAMPLE IV

A lixiviant solution was prepared as in Example III. Approximately two pounds of Maries Oxide, ¼ inch ore was added to the lixiviant solution. After approximately 2 hours of contact time, approximately 0.078 oz. Au/ton was dissolved in this solution. This pregnant solution was then passed once through an activated carbon column, and the remaining barren solution contained 0.008 oz. Au/ton. This resulted in a precious metal deposition efficiency in the packed column of 89.7%.

EXAMPLE V

A lixiviant solution was prepared as in Example IV, and approximately two pounds of the same Maries Oxide ore was added thereto. After one hour of contact time, 0.094 oz. Au/ton was dissolved in the extractant solution. This pregnant solution was then passed once through a packed carbon column, and the barren solution contained 0.006 oz. Au/ton. This barren solution was then passed through the same packed column, resulting in no change. Thus, a deposition efficiency as a result of the lixiviant solution of the present invention was 93.6% in the packed column.

EXAMPLE VI

Approximately two pounds of the Maries Oxide, ¼ inch ore was added to a lixiviant solution prepared as the previous examples III–V. After four hours of contact time, the ore had yielded up 0.21 oz. Au/ton to the solution. After approximately eight hours contact time, the pregnant solution contained 0.23 oz. Au/ton. This solution was then passed once through a packed activated carbon bed, and the resulting barren solution contained 0.004 oz. Au/ton. This amounted to a deposition efficiency of gold onto the carbon bed of 98.3%.

EXAMPLE VII

A lixiviant solution as in previous examples was prepared, and approximately twenty pounds of −20 mesh Arizona sand ore was added to the solution. After the first 2.5 hours exposure time between the ore and the solution, 0.164 oz. Au/ton was dissolved in the solution. After six hours of exposure time, the pregnant solution contained 0.188 oz. Au/ton. This lixiviant solution containing the dissolved Au was then passed once through a packed activated carbon bed, and the resultant barren solution amounted to 0.02 oz. Au/ton. Moreover, a fire assay of the pregnant carbon provided a measurement of 0.16 oz. Au/ton. This particular Example VII resulted in a deposition efficiency of 89.4% of the Au into the packed carbon bed.

EXAMPLE VIII

A lixiviant solution was prepared as in previous examples, and again a two pound sample of the Arizona sand ore was admixed therewith. After eight hours of contact time between the ore and the lixiviant solution, the pregnant solution contained 0.21 oz. Au/ton. This pregnant solution was then passed once through an activated carbon bed, and the resultant barren solution contained 0.005 oz. Au/ton. This amounted to a deposition efficiency of the Au onto the carbon bed of 97.6%.

EXAMPLE IX

A lixiviant solution was prepared as in the previous examples, and approximately 2 pounds of −100 mesh quartzite ore was mixed therewith. After one hour of contact between the ore and the lixiviant solution, the pregnant solution contained 0.152 oz. Au/ton. After four hours of such contact time, the pregnant solution contained 0.175 oz. Au/ton. This pregnant solution was then passed through a carbon bed, and the barren solution resulting therefrom contained 0.017 oz. Au/ton. This amounted to a deposition efficiency of 90.3%.

EXAMPLE X

A lixiviant solution was prepared as previously described, and two pounds of the −100 mesh quartzite ore was added thereto. After five hours of contact time between the ore and the lixiviant solution, approximately 0.213 oz. Au/ton was dissolved in the pregnant solution. This pregnant solution was then passed through an activated carbon bed, and the barren solution contained 0.021 oz. Au/ton. This resulted in a deposition efficiency of 90.1%.

EXAMPLE XI

In this Example XI, a lixiviant solution was again prepared as in previous examples, and two pounds of the −100 mesh quartzite ore was added thereto. After three hours of contact time between the solution and the ore, approximately 0.289 oz. Au/ton was dissolved in the solution. After approximately five hours contact time, 0.332 oz. Au/ton was dissolved. This pregnant solution was then passed through a packed carbon bed, and the barren solution contained 0.018 oz. Au/ton. This amounted to a deposition efficiency of 94.3%.

EXAMPLE XII

A lixiviant solution as in previous examples was again prepared, and two pounds of the −100 mesh quartzite ore were added thereto. After three hours of contact time between the solution and the ore, 0.293 oz. Au/ton was extracted from the ore. This pregnant solution was then passed through a packed carbon bed, and the barren solution contained 0.017 oz. Au/ton. This amounted to a deposition efficiency of 94.2% of the gold extracted from the ore by the lixiviant solution.

EXAMPLE XIII

A lixiviant solution was again prepared as in previous examples, and approximately twenty pounds −20 mesh Hoffman sand ore was added to the solution. After both four and six hours contact time, the pregnant solution contained 0.23 oz. Au/ton. This pregnant solution containing the extracted gold was then passed once through a packed activated carbon bed, and the resulting barren solution contained 0.04 oz. Au/ton. This amounted to a deposition efficiency of 82.6%.

EXAMPLE XIV

A test was performed on Blue Bird ore from the Cook City, Mont. New World mining district. First, a 40 pound sample of Blue Bird ore was added to about 80 pounds of a lixiviant solution containing thiourea and potassium lignin sulfonate, as in the previous examples, but having no urea; the yield was 0.03 oz. Au/ton and a silver deposition of 89%. Then a similar solution, but this time containing urea as in the previous examples, was combined with a 40 pound sample of Blue Bird ore, and the yield was 0.089 oz. Au/ton and a silver deposition of 94%. At a price of $300 per ounce of gold, the addition of the urea results in additional revenue of $18 per ton, an amount that in many cases is enough to make the difference between a commercially feasible process and one that is not commercially feasible.

EXAMPLE XV

This example compares an extraction of gold by means of a cyanide process with an extraction according to the present invention. Gold was extracted from a 20 ton quantity of Maries Oxide ore by means of a closed circuit cyanide lixiviation process. The process was continued for 3.5 days, and the yield was a 71.2% deposition of gold on a carbon bed. Gold was then extracted from another 20 ton quantity of Maries Oxide ore by means of a closed circuit process using a solution of thiourea, urea, and potassium lignin sulfonate as in the previous examples; the process was continued for 4 hours and 18 minutes, and the yield was 92.4% deposition of gold on the carbon bed. Because the present invention results in such a substantial saving of time, as well as a higher yield, a plant that is intended to process a given quantity of ore per day by means of the present invention requires much less capital equipment and therefore can be constructed much more economically than can a plant that processes ore by means of cyanide lixiviation.

EXAMPLE XVI

A cost analysis of extracting gold from Maries Oxide ore by means of a process according to the present invention was performed based on an assumed processing rate of 100 tons of ore per day. A 27-sample average shows that Maries Oxide ore contains about 0.25 ounces of gold per ton of ore. Assuming (1) an efficiency of only 75% for the extraction process (even though the previous examples show that an efficiency of 90%–93% is commercially realizable), (2) an efficiency of 95% for a smelter that removes the gold from the carbon bed, and (3) a smelter charge of 93%, the net amount of gold recovered by the process of the present invention would be about 0.165 ounces per ton. At a price of about $300 per ounce of gold and at 25 working days per month, the gross yield is about $123,750 per month. The operating cost for such a process is about $45,000 to $50,000 per month, for a gross profit of about $73,750 to $78,750 per month.

The present invention provides a process for extracting precious metals such as gold and silver from relatively low grade ores. Unlike the cyanide process, the process of the present invention does not use toxic chemicals and hence is much safer. Workers in a mill that utilizes the process of the present invention do not risk exposure to cyanide; aside from the obvious health benefits of eliminating this risk, costly safety precautions that must be used when working with cyanide can be dispensed with. Moreover, the tails that are left over after processing with cyanide are highly toxic and environmentally damaging and are extremely difficult to dispose of safely. Such methods as storing the tails in specially lined concrete ponds, using specially developed organisms to break down the cyanide, or pumping the tails into mine shafts must be used, but even when these methods are employed some of the cyanide usually manages to escape into nearby soil, polluting the ground water and inflicting other damage on the environment. By contrast, the tails from the process of the present invention require only an inexpensive treatment with lime (about ten pounds of lime per ton of tails) to neutralize the acidity and render the tails harmless; the tails may then be simply spread upon the ground. In fact, the neutralized tails can even be used as nitrate fertilizers.

The process of the present invention offers substantial economic benefits in addition to its environmental and safety advantages. As already noted, the amount of gold and silver recoverable from a given quantity of ore is substantially increased; even more important, the processing time is greatly reduced, typically from several days to a few hours. The process of the present invention is readily adaptable to large scale operations and the improvement in cost effectiveness is such that, for example, whereas it would cost some $15 million to construct a new processing mill to process about 500 tons of jardine ore per day utilizing the cyanide process, a mill having a similar capacity and utilizing the process of the present invention would only cost about $2 million to build.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A process for the recovery of precious metals from ore containing the same comprising:
   forming an acidic aqueous lixiviant solution containing a thiourea compound, urea and an alkaline lignin sulfonate;
   exposing the ore to said lixiviant solution to extract the precious metals therefrom; and
   recovering the dissolved precious metals from said solution.

2. The process as claimed in claim 1, wherein the pH of said lixiviant solution is approximately 1.0–1.5.

3. The process as claimed in claim 1 wherein the thiourea compound is selected from the group comprising thiourea, phenylthiourea, alkyl and alkyl derivatives of thiourea, and thiosemicarbazide.

4. The process as claimed in claim 1, wherein said lixiviant solution includes ferric sulfate.

5. The process as claimed in claim 1, wherein said lixiviant solution comprises an aqueous solution of thiourea, ferric sulfate, potassium lignin sulfonate and urea.

6. The process as claimed in claim 5, wherein the pH of said lixiviant solution is maintained at approximately 1.0–1.5.

7. The process as claimed in claim 1, wherein said dissolved precious metals are recovered by passing the lixiviant solution containing said dissolved precious metals through a packed bed extraction column to remove the precious metals from solution, and recovering the precious metals from said packed bed.

8. The process as claimed in claim 7, wherein said packed bed comprises an agent selected from the group consisting of activated charcoal, powdered aluminum, powdered lead, and powdered zinc.

9. The process as claimed in claim 1, wherein said ore remains in contact with said lixiviant solution for approximately 2–6 hours, said solution extracting at least approximately 98 percent of the precious metals from said ore.

10. The process as claimed in claim 1, wherein said precious metals comprise gold and silver.

11. The process as claimed in claim 1, wherein said thiourea compound comprises thiourea.

12. The process as claimed in claim 1, wherein the ratio of urea to thiourea is between about 1:9 and 9:1.

13. The process as claimed in claim 1, wherein the concentration of the alkaline lignin sulfonate is not less than about twenty percent of the concentration of the thiourea compound and the urea together.

14. The process as claimed in claim 1, wherein the alkaline lignin sulfonate comprises potassium lignin sulfonate.

15. The process as claimed in claim 1, wherein the alkaline lignin sulfonate comprises sodium lignin sulfonate.

16. In a process for recovering precious metals from ore containing the same wherein said precious metals are lixiviated from said ore by an acidic aqueous lixiviant solution containing a thiourea compound and subsequently deposited in a packed bed extraction column, the improvement comprising adding urea and an alkaline lignin sulfonate to said thiourea lixiviant to increase the extraction of said precious metals by said lixiviant and to increase the recovery rate of dissolved precious metals by said extraction column.

17. The process as claimed in claim 16, wherein ferric sulfate is also added to said thiourea lixiviant along with said urea and alkaline lignin sulfonate.

18. The process as claimed in claim 16, wherein the pH of said thiourea lixiviant is maintained less than about 3.5 after the addition of said urea and alkaline lignin sulfonate by adding an acid thereto.

19. The process as claimed in claim 18, wherein the acid comprises sulphuric acid.

20. The process as claimed in claim 18, wherein said pH is maintained at approximately 1.0–1.5.

21. The process as claimed in claim 20, wherein the acid comprises sulphuric acid.

22. The process as claimed in claim 16, wherein the resultant lixiviant comprises an aqueous solution of thiourea, ferric sulfate, urea, and potassium lignin sulfonate.

23. The process as claimed in claim 22, wherein the pH of said aqueous solution is maintained at a level of approximately 1.0–1.5 by adding an acid thereto.

24. The process as claimed in claim 23, wherein the acid comprises sulphuric acid.

25. The process as claimed in claim 16, wherein said packed bed comprises a powdered deposition agent selected from the group consisting of activated charcoal, powdered aluminum, powdered zinc, and powdered lead.

26. The process as claimed in claim 16, wherein said precious metals comprise silver and gold.

27. The process as claimed in claim 16, wherein the ratio of urea to thiourea in the lixiviant after the urea has been added thereto is between about 1:9 and 9:1.

28. The process as claimed in claim 16, wherein the concentration of the alkaline lignin sulfonate is not less than about twenty percent of the concentration of the thiourea compound and the urea together.

29. The process as claimed in claim 16, wherein the alkaline lignin sulfonate comprises potassium lignin sulfonate.

30. The process as claimed in claim 16, wherein the alkaline lignin sulfonate comprises sodium lignin sulfonate.

31. A process for increasing the precious metal extraction capability of an acidic aqueous lixiviant solution containing a thiourea compound when subjecting an ore containing said precious metals to said lixiviant, said process comprising adding urea to said lixiviant.

32. The process as claimed in claim 31, wherein ferric sulfate is also added to said lixiviant.

33. The process as claimed in claim 31, wherein said lixiviant comprises an aqueous solution of thiourea, and wherein a sufficient amount of urea is added to produce a lixiviant solution containing approximately equal amounts of urea and the thiourea compound.

34. The process as claimed in claim 31, wherein the pH of said lixiviant is maintained less than about 3.5 by adding an acid thereto.

35. The process as claimed in claim 34, wherein the acid comprises sulphuric acid.

36. The process as claimed in claim 34, wherein said pH is maintained at approximately 1.0–1.5.

37. The process as claimed in claim 36, wherein the acid comprises sulphuric acid.

38. The process as claimed in claim 31, wherein an alkaline lignin sulfonate is also added to said lixiviant to increase the subsequent recovery of dissolved precious metals from said lixiviant solution.

39. The process as claimed in claim 38, wherein the alkaline lignin sulfonate comprises potassium lignin sulfonate.

40. The process as claimed in claim 38, wherein the alkaline lignin sulfonate comprises sodium lignin sulfonate.

41. The process as claimed in claim 31, wherein said ore is subjected to said lixiviant for approximately 2-6 hours after said urea is added.

42. The process as claimed in claim 31, wherein said precious metals comprise silver and gold.

43. A process for increasing the recovery rate of dissolved precious metals from an acidic aqueous lixiviant solution containing a thiourea compound by a packed bed extraction column when passing said solution through said bed to deposit the precious metals thereon, said process comprising adding an alkaline lignin sulfonate to said lixiviant solution prior to passing said solution through said packed bed.

44. The process as claimed in claim 43, wherein said alkaline lignin sulfonate is added prior to lixiviating said ore.

45. The process as claimed in claim 44, wherein urea is also added with said alkaline lignin sulfonate prior to lixiviating said ore to increase the extraction of said metals by said lixiviant.

46. The process as claimed in claim 45, wherein ferric sulfate is added along with said urea and said alkaline lignin sulfonate.

47. The process as claimed in claim 43, wherein the alkaline lignin sulfonate comprises potassium lignin sulfonate.

48. The process as claimed in claim 43, wherein the alkaline lignin sulfonate comprises sodium lignin sulfonate.

49. The process as claimed in claim 43 wherein the pH of said lixiviant solution is maintained less than about 3.5 by adding an acid thereto.

50. The process as claimed in claim 49 wherein the acid comprises sulphuric acid.

51. The process as claimed in claim 43, wherein said precious metals comprise silver and gold.

52. The process as claimed in claim 43, wherein said packed bed comprises a powdered deposition agent selected from the group consisting of activated charcoal, powdered aluminum, powdered zinc, and powdered lead.

* * * * *